Sept. 23, 1941. S. F. NIELSEN ET AL Re. 21,905
BUILDING CONSTRUCTION
Original Filed March 26, 1937 2 Sheets-Sheet 1
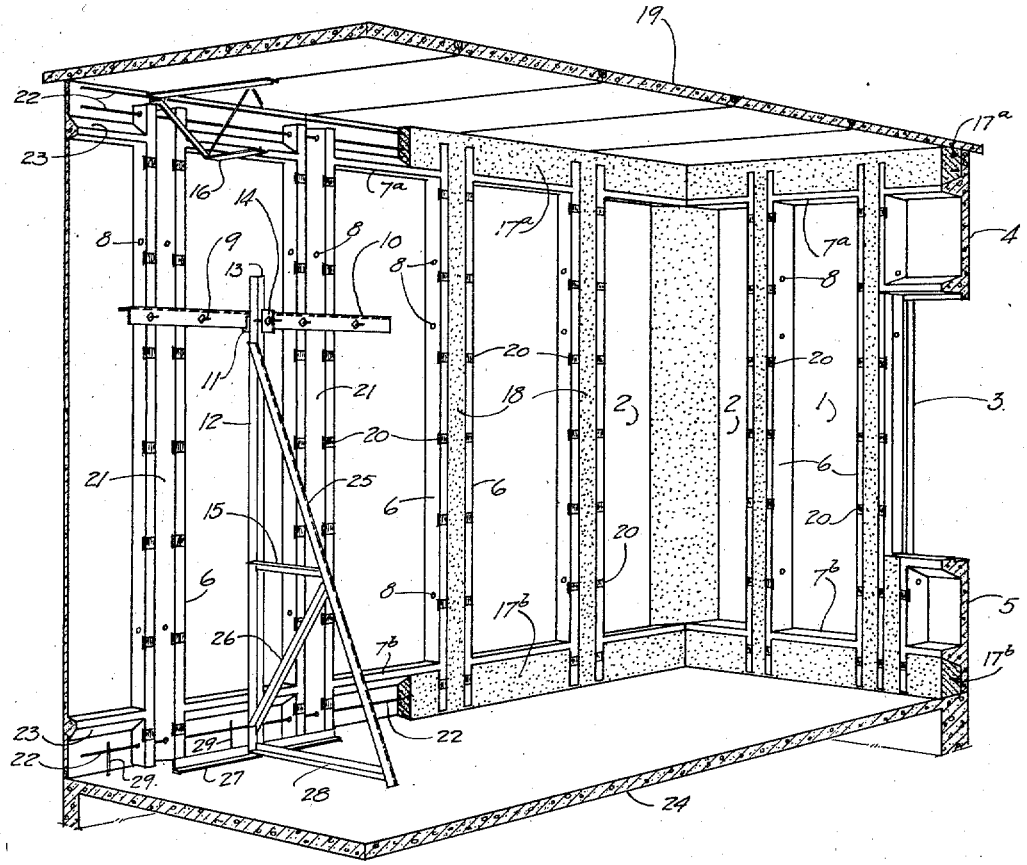
FIG. I.
INVENTORS
S. F. NIELSEN
FRED BOSTAD
BY: Everett M. Curtis
ATTORNEY.

Sept. 23, 1941. S. F. NIELSEN ET AL Re. 21,905
BUILDING CONSTRUCTION
Original Filed March 26, 1937 2 Sheets-Sheet 2
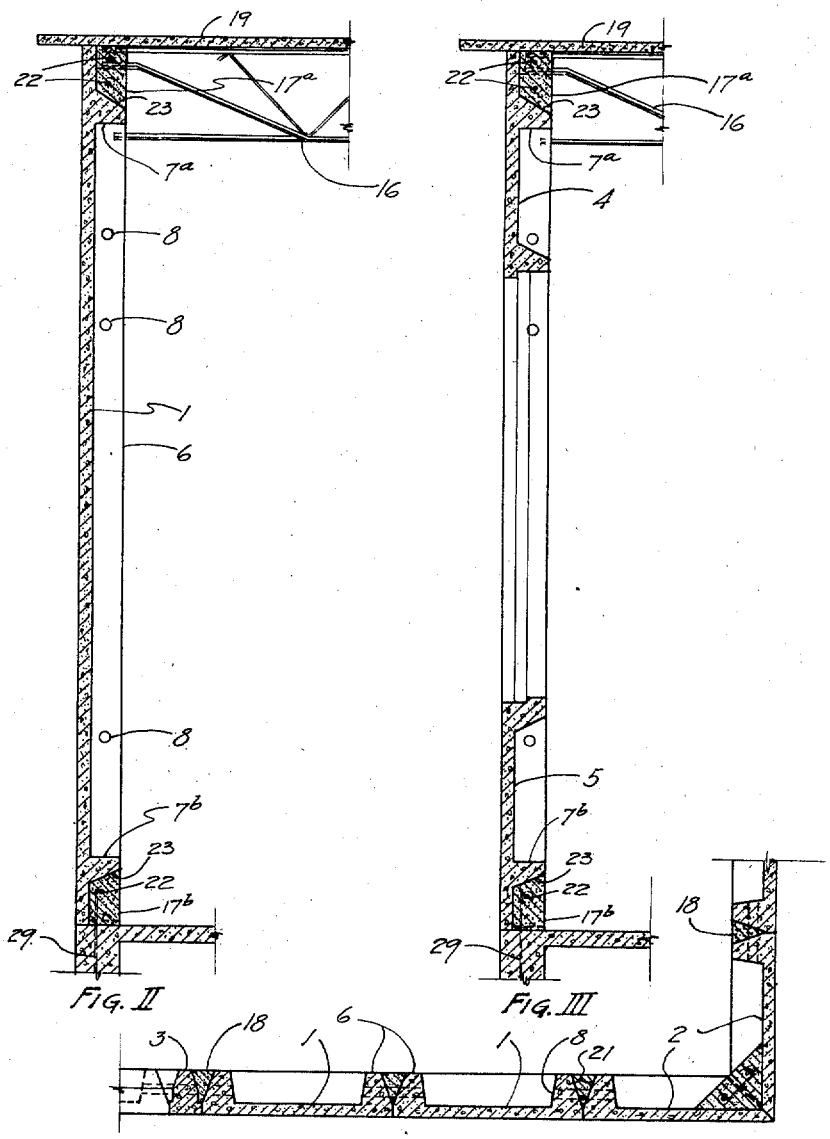
INVENTORS
S. F. NIELSEN
FRED BOSTAD
BY: Everett N. Curtis
ATTORNEY Reissued Sept. 23, 1941

Re. 21,905

UNITED STATES PATENT OFFICE 21,905

BUILDING CONSTRUCTION

Sverre F. Nielsen, San Diego, and Fred Bostad, Los Angeles, Calif.

Original No. 2,139,907, dated December 13, 1938, Serial No. 133,212, March 26, 1937. Application for reissue March 6, 1940, Serial No. 322,630

9 Claims. (Cl. 72—16)

Our invention relates generally to improvements in building structures and more specifically to walls, floor and roof construction and the method of assembling, erecting and connecting the same into a rigid and permanent building; and its objects are to dispense with the use of removable temporary forms into which concrete or other cementitious material is required to be poured; to provide prefabricated units for building with a system of assemblage created by the construction upon the ground of cementitious tie beams and columns capable of supporting and sustaining the completed structure; to assure a more speedy construction of building and less employment of labor than has heretofore been possible; to effect a greater saving in the cost of materials and building construction; to simplify the erection of buildings and to render more effective and serviceable the several units of construction after they have been permanently assembled. Other objects of our invention will appear as incorporated in other features more fully illustrated in the drawings and more particularly hereinafter described and set forth in the claims.

We are aware, in the present system of construction commonly employed by builders, that three methods are used; first, the election of blocks or units, one on top of the other, with mortar and binding material between each unit; second, the erection of a frame of steel, concrete or wood, to which are attached in well known ways various kinds of insulating and finish materials; and third, the erection of a set of forms into which reinforcing steel or mesh is introduced, and concrete or other cementitious material is poured or applied.

Our invention introduces an entirely new system as we erect the prefabricated finish and insulating wall in units first, and by arrangement of ribs in these units apply the connecting and stiffening frame, consisting of columns or studs and beams afterwards, by use of cement gun concrete or similar method or material and application from one side without use of temporary forms for this application.

This procedure effectuates a considerable saving in labor and time at point of erection, as the units may be fabricated in a plant, and then later erected and tied together in one operation of construction, making possible a saving of more than half the construction time necessary under present methods. A rigid, fireproof, earthquake resistive and vermin-proof structure is also obtained without the slow process of masonry construction or concrete pouring on the job.

The prefabricated units forming the wall may consist of reinforced concrete or other suitable materials, constructed with ribs to form spaces inclosed on two or more sides into which connections in form of columns or studs and tie-beams may be applied without use of temporary forms. By arrangement of ribs or clips in the wall units, floor and ceiling joists may be supported on the units before the columns and beams are applied, and thereby effectuate a rigid connection for transmittal of lateral forces through the beams, columns, and joists.

Prefabricated roof and floor units may be used with joints so formed as to permit filling with cement mortar or other cementitious materials. Wires, clips or bolts may be arranged so as to permit connection of units to joists, as well as tying sections together into one solid unit.

Attention is hereby directed to the drawings, in which similar numerals of designation refer to similar parts throughout the several views, and in which:

Figure I is a perspective view partly in section, of a wall and corner of our improved building construction, showing a number of the beams and columns already erected, and one of the erection frames in sustaining position before the installation of the beams and columns adjacent thereto;

Figure II is a typical vertical section of a one story wall and adjacent floof and roof of our improved construction;

Figure III is a typical vertical section through a window of such construction; and Figure IV is a typical horizontal section of our improved construction, showing a corner and jamb for a window or door opening.

Referring to the drawings, we preferably construct each prefabricated wall unit 1, with an elongated panel, and with vertical ribs 6 and horizontal ribs 7*a* and 7*b*, which ribs are for the purpose of strengthening such unit in handling and in erection and for providing necessary backing for the reception of columns 18 and tie-beams 17*a* and 17*b*, which are made of concrete or other cementitious material. Preferably the vertical abutting edges of the units 1 are so shaped as to form, adjacent to said edges and between the ribs 6, a wedged shaped channel 21 for the reception of one of the columns 18. Preferably each of said wall units is, as shown, of full story height.

The horizontal ribs 7*a* and 7*b*, each located a short distance, respectively, from the upper and lower ends of the vertical ribs 6, are preferably each provided with a bevel surface 23. For the purpose of reinforcement of the beams 17*a* and 17*b* we construct each of said ends of the vertical ribs 6 with horizontal bores or holes through which extend the metal bars or wires 22. As shown, the said ends do not extend completely across the beams 17*a* and 17*b*, but are embedded therein, so that each beam is continuous in structure.

In the case of windows or doors, unit lintels 4 are supplied in such sizes as may be required, and where windows are contemplated the proper desired opening is secured by units 5 designed to accompany the same and to conform thereto, the structure of both lintels 4 and units 5 being generally the same as units 1. To support the said lintels and properly finish the openings so provided for doors or windows, jambs 3 may be supplied.

The roof or floor joists 16 may be of steel, concrete or other suitable material, and are supported upon the vertical ribs 6 until the tie beams 17 and the columns 18 are applied and hardened. These beams and columns may be cement gun concrete or other suitable cementitious materials applied under pressure and without the use of temporary molds or forms. Roof or upper floor units 19 are preferably installed with joints directly above one of the joists 16, only one of such joists being shown in Figure I, the remainder being shown removed for the sake of clearness. Wires or clips may be supplied to permit attachment to the joists as well as to the individual units, and the joints may be filled with mortar or similar material, making a slab rigid enough for the transmittal of horizontal forces. Furring for the support of interior finish may be attached to the ribs 6 by nails driven through said furring into nailing blocks 20 cast into said ribs at the time of manufacture.

In order to provide a means to facilitate the handling of units 1 and to permit the attachment of temporary erection hooks, we core each rib at desirable places and intervals with holes 8. Such holes also permit the insertion of dowels and reinforcing steel for the strengthening of connections and frame, and they may in suitable instances permit passage of conduits and piping. By the employment of a whaler angle 10, erection hooks 9, inserted through holes or slots in said angle, are temporarily secured to said holes 8 and serve to hold a number of the units 1 in place while the columns 18 and beams 17*a* and 17*b* are being installed and until they have become hardened. The whaler angle 10 is so positioned as to present to the face of each of the ribs 6 a straight edge. It is so arranged as to permit application of columns and beams in one operation without removing said angle, and is made adjustable by means of a clamp 11 attached to a threaded bolt projecting through two sections of material in the erection or supporting frame 13, which bolt is secured in position by the nut 14 on the threaded end thereof.

The frame 13 may be of wood, metal or other suitable material, and is preferably constructed with an upright 12, braces 25 and 26, and floor strips 27 and 28 resting upon the floor slab 24 or adjacent thereto. The strip 15 forming part of the said frame 13 may be used, where more than one frame is employed, to provide a support for temporary scaffolding, and if desired the frame may be secured to the floor 24 by any suitable means.

In erecting and connecting the prefabricated units 1 in a building construction after the floor or floor slab 24 has been installed, we first place in proper position and at suitable spacing the removable erection frames 13 in such number as may be required, and temporarily attach the same to the floor in any suitable manner. At the same time we attach a whaler angle 10 to each frame, and align the straight edges of said whaler angles so as to present a straight support for the units along each wall. Preferably starting at one corner and continuing around the building, the units 1 are then placed in vertiposition edge to edge upon the end surface of the floor slab 24 and secured thereto by dowel pins 29, so as to bear uniformly against the straight edges aforesaid, and the erection hooks 9 are affixed to the units and the whaler angles 10 firmly secured thereto. Thereupon the roof joists 16 and the slabs 19 are installed in the positions indicated in the drawings, the bars 22 being inserted as shown. Concrete or other cementitious material is then applied by a cement gun in the well known manner to fill the channels 21 and channels adjacent to the bevel surfaces 22 to form the columns 18 and tie-beams 17*a* and 17*b* constituting the connecting and stiffening frame supporting the general structure. After such material has become hardened, the temporary frames 13 are removed, and the walls finished in any desired manner, such as the installation of damp proofing and insulating materials against the erected wall, the attaching of furring strips. As a result of such construction, an integral supporting frame of reinforced concrete or other cementitious material applied by a cement gun is provided, all parts of which frame are thoroughly bonded together and to the prefabricated wall units, with integral structural connections capable of transmitting and resisting all lateral and vertical forces to which the structure may be exposed. By the use of the word "integral" as used in this connection and in the appended claims, we desire to be understood as indicating the definite structural bond between frame and units obtained by a pressure or "gun" application of the frame, as opposed to the pouring or running in place of a concrete frame which upon hardening furnishes no structural connection between frame and units, and is only equivalent to an ordinary mortar joint so far as structural strength is concerned.

Our invention may be embodied in other specific forms without departing from the spirit or essential characteristics thereof. The present embodiment is therefore to be considered in all respects as illustrative and not restrictive, the scope of our invention being indicated by the appended claims rather than by the foregoing description, and all changes which come within the meaning and range of equivalency are therefore intended to be embraced therein.

What we claim and desire to secure by Letters Patent is:

1. Building construction including wall portions formed of a plurality of substantially wall height panels disposed in side by side relationship, each of said panels having side walls, the adjacent side walls of adjacent panels being spaced apart at their outer edges and converging inwardly of the wall whereby to provide a concrete receiving column form, and each of said panels having a horizontally extending rib spaced from the adjacent end of the panel and whose respective ends intersect the respective side walls of the panel, each of said ribs having a beveled face providing one face of a concrete receiving beam form.

2. Building construction of the class described comprising, in combination, a ceiling, a floor and walls formed by a plurality of substantially wall-height panels disposed vertically in side by side relationship between said ceiling and floor, each of said panels having at each of its vertical side edges a vertically extending inwardly directed rib, each of said ribs having an inwardly beveled outer face which, in conjunction with a like face of an adjacent rib of an adjacent panel, forms a concrete receiving form of V-shaped cross-section between adjacent panels and each of said panels having adjacent its top edge a horizontal rib extending from one to the other of said vertical ribs and presenting a top face providing one wall of a horizontal concrete receiving form, the adjacent ceiling surface providing another wall for said form, said top face being beveled away from said adjacent panel edge.

3. Building construction of the class described comprising, in combination, a ceiling, a floor and walls formed by a plurality of substantially wall-height panels disposed vertically in side by side relationship between said ceiling and floor, each of said panels having at each of its vertical side edges a vertically extending inwardly directed rib, each of said ribs having an inwardly beveled outer face which, in conjunction with a like face of an adjacent rib of an adjacent panel, forms a concrete receiving form of V-shaped cross-section between adjacent panels and each of said panels having adjacent its bottom edge a horizontal rib extending from one to the other of said vertical ribs and presenting a bottom face providing one wall of a horizontal concrete receiving form, the adjacent floor surface providing another wall for said form, said top face being bevelled away from said adjacent panel edge.

4. Building construction of the class described comprising, in combination, a ceiling, a floor and walls formed by a plurality of substantially wall-height panels disposed vertically in side by side relationship between said ceiling and floor, each of said panels having at each of its vertical side edges a vertically extending inwardly directed rib, each of said ribs having an inwardly beveled outer face which, in conjunction with a like face of an adjacent rib of an adjacent panel, forms a concrete receiving form of V-shaped cross-section between adjacent panels and each of said panels having adjacent each of its horizontal edges a horizontal rib extending from one of said vertical ribs to the other and presenting towards the adjacent panel edge a face beveled away from said adjacent panel edge and providing one wall surface of a horizontal concrete receiving form.

5. Building construction of the class described comprising, in combination, a ceiling, a floor and walls formed by a plurality of substantially wall-height panels disposed vertically in side by side relationship between said ceiling and floor, each of said panels having at each of its vertical side edges a vertically extending inwardly directed rib, each of said ribs having an inwardly beveled outer face which, in conjunction with a like face of an adjacent rib of an adjacent panel, forms a concrete receiving form of V-shaped cross-section between adjacent panels, each of said panels having adjacent each of its horizontal edges a horizontal rib extending from one of said vertical ribs to the other and presenting towards the adjacent panel edge a face beveled away from said adjacent panel edge and providing one wall surface of a horizontal concrete receiving form, and a filling of cementitious material in each of said vertical and horizontal forms, said filling forming a structural frame.

6. The combination of claim 2 which includes a hole through each of said vertical ribs at a point between the ceiling and the adjacent horizontal rib, the holes of adjacent ribs being in alignment, and a continuous reenforcing rod extending through said holes and longitudinally along said horizontal forms.

7. The combination of claim 3 which includes a hole through each of said vertical ribs at a point between the floor and the adjacent horizontal rib, the holes of adjacent ribs being in alignment, and a continuous reenforcing rod extending through said holes and longitudinally along said horizontal forms.

8. Building construction including wall portions formed of a plurality of substantially wall-height panels disposed in side by side relationship, each of said panels having an inwardly disposed vertical rib at each of its vertical side edges, a pair of less than wall-height panels positioned between two of said substantially wall-height panels and being vertically spaced apart to provide a wall opening therebetween, each of said less than wall-height panels having a horizontal rib portion defining one surface of the opening and a vertical rib at each of its side edges, each of the vertical ribs of the said wall-height and less than wall-height panels having an inwardly beveled face which, together with a like face of an adjacent rib, forms a concrete receiving channel of V-shaped cross-section.

9. The building construction method which comprises prefabricating wall height panels each having a vertical side edge surface extending at an acute angle to the plane of the panel, assembling said panels in side by side relationship to form a wall having between adjacent side edge surfaces of adjacent panels a vertical wall-height channel of V-shaped cross-section presenting an outwardly flared opening, then forming a column structure in said wall by projecting concrete under pressure into said channel through said opening from a direction angular to the plane of the wall.

SVERRE F. NIELSEN.
FRED BOSTAD.